Patented Oct. 23, 1928.

1,688,964

UNITED STATES PATENT OFFICE.

HANS HAHL, OF ELBERFELD, GERMANY, ASSIGNOR TO WINTHROP CHEMICAL COMPANY, INC., OF NEW YORK, N. Y.

COMPLEX ANTIMONY COMPOUND.

No Drawing. Original application filed March 29, 1926, Serial No. 98,272, and in Germany June 8, 1925. Divided and this application filed October 8, 1926. Serial No. 140,420.

The present invention has for its subject a new process for the manufacture of new complex antimony compounds and the products obtained. This is a division of Serial No. 98,272, filed March 29, 1926.

According to this invention an antimonyl compound of such polyphenols as contain two hydroxyl groups in the ortho-position to each other, is caused to interact with a neutral salt of an aliphatic hydroxy acid, of which tartaric acid and citric acid may be mentioned.

The new compounds are in most cases colourless or only slightly coloured substances, the neutral aqueous solutions of which are not precipitated by alkalies but are precipitated by alkali metal sulphides. They possess outstanding specific acting properties and are intended to find application in therapy. Their aqueous solutions possess no irritant effect and can be sterilized at 100° C.

The following example serves to illustrate the invention:—

*Example.*—20 parts by weight of tartaric acid are dissolved in 200 parts of water and neutralized with 38 parts by weight of crystalline sodium carbonate. The clear solution is then heated for some time together with 33 parts by weight of antimonyl pyrocatechin, when the latter passes almost completely into solution. The liquid is filtered and the filtrate evaporated until crystallization commences. On cooling, the sodium salt of a complex antimonyl pyrocatechin tartaric acid separates in colourless needles which may be recrystallized from alcohol-acetone. It has most probably the formula

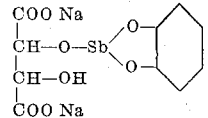

It is a whitish powder easily soluble in water.

I claim:

1. The process for the manufacture of complex antimony compounds, which process consists in causing an antimonyl compound of a polyphenol containing two hydroxyl groups in ortho-position to each other to interact with a neutral salt of an aliphatic hydroxy acid.

2. The new complex antimony compounds being derived from an aliphatic hydroxy acid and an antimonyl compound of such a polyphenol as contains two hydroxyl groups in ortho-position to each other being generally in the form of their alkali metal salts, colorless or slightly colored substances, the neutral aqueous solutions of which are not precipitated by alkalies but are precipitated by alkali sulphides, possessing outstanding specific acting properties and being intended to find application in therapy.

3. The new complex antimony compound being derived from tartaric acid and antimonyl pyrocatechin having in the form of its sodium salt most probably the formula

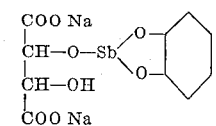

which sodium salt forms colorless needles which crystallize from alcohol-acetone and are easily soluble in water, being a useful product in therapy.

In testimony whereof I have hereunto set my hand.

HANS HAHL.